United States Patent [19]

Oshima et al.

[11] 4,041,120
[45] Aug. 9, 1977

[54] PROCESS FOR PRODUCING A SYNTHETIC RESIN ARTICLE HAVING IMPROVED RESISTANCE TO SURFACE ABRASION

[75] Inventors: Akira Oshima; Keisuke Yoshihara; Mikio Shiki; Tuneo Ikeda, all of Otake, Japan

[73] Assignee: Mitsubishi Rayon Co., Ltd., Tokyo, Japan

[21] Appl. No.: 473,910

[22] Filed: May 28, 1974

Related U.S. Application Data

[62] Division of Ser. No. 212,047, Dec. 27, 1971, abandoned.

[30] Foreign Application Priority Data

Dec. 28, 1970 Japan .............................. 46-119373

[51] Int. Cl.$^2$ ..................... B29D 7/08; B29D 7/14; B29D 9/00
[52] U.S. Cl. ................................... 264/171; 264/216; 264/255; 264/261; 264/297; 264/316
[58] Field of Search ............... 264/255, 171, 316, 216, 264/297, 212, 213, 308, 261; 260/89.5 R

[56] References Cited

U.S. PATENT DOCUMENTS

| | | | |
|---|---|---|---|
| 2,989,774 | 6/1961 | Erickson et al. | 264/297 |
| 2,997,745 | 8/1961 | Kroeker | 264/240 |
| 3,506,755 | 4/1970 | Rudder et al. | 264/297 |
| 3,518,341 | 6/1970 | Haryu | 264/255 |
| 3,551,311 | 12/1970 | Nass et al. | 260/89.5 R |
| 3,600,490 | 8/1971 | Billingsley et al. | 264/213 X |
| 3,682,875 | 8/1972 | O'Sullivan et al. | 260/86.1 E |
| 3,704,264 | 11/1972 | Gorman | 260/89.5 R |
| 3,872,197 | 3/1975 | Kato et al. | 264/216 |

*Primary Examiner*—Jan H. Silbaugh
*Attorney, Agent, or Firm*—Armstrong, Nikaido & Marmelstein

[57] ABSTRACT

A process for producing a synthetic resin article having an excellent resistance to surface abrasion is described which is characterized by having a synthetic resin surface layer, firmly adhered to the base resin, the synthetic resin surface layer comprising a polymer or copolymer containing at least 40% by weight in polymerized form of at least one compound having a total of at least three acryloxy ($CH_2=CH.CO.O-$) and/or methacryloxy ($CH_2=CH(CH_3)CO.O-$) groups in the molecule. The article is prepared by (1) forming the above synthetic resin layer on the inner surface of a mold and then, charging a monomer for base resin into the mold and polymerizing the monomer, or (2) directly forming the synthetic resin surface layer on the surface of a synthetic resin shaped article.

10 Claims, 2 Drawing Figures

Fig. 1

Fig. 2

PROCESS FOR PRODUCING A SYNTHETIC RESIN ARTICLE HAVING IMPROVED RESISTANCE TO SURFACE ABRASION

This is a division, of application Ser. No. 212,047, filed Dec. 27, 1971 now abandoned.

The present invention relates to a process for producing a synthetic resin shaped article having excellent resistance to surface abrasion.

In order to impart an abrasion resistance to the surface of a synthetic resin cast article such as acrylic resin, some methods have already been proposed which comprise first forming a polymer film made from a crosslinking monomer on the inner surface of a mold and then, charging monomeric material for base resin into the mode and polymerizing it. There exist however many factors affecting the process of manufacture and quality of the cast article, such as the particular crosslinking monomer, the extent of hardening of the film formed on the inner surface of the mold, and affinity of the film for the monomeric material for base resin to be charged into the mold, and adhesion between the film and the mold and between the film and the base resin prepared from the monomer.

For example, there are methods such as involving the steps of coating the inner surface of a mold with a partially polymerized material of allylmethacrylate (as described in U.S. Pat. No. 2,479,935) or diethylene glycol dimethacrylate (as described in U.S. Pat. No. 2,997,745) to form a film thereby and then, charging a monomeric material for base resin into the mold and polymerizing the monomeric material simultaneously with the material coated on the inner surface.

However, since the film of the partially polymerized material coated on the inner surface of the mold is in a gel state or incompletely hardened state, the film tends to be swollen with or dissolved in the monomeric material for base resin filled later therein, causing some undesirable phenomena such as migration of the monomeric material through the film layer to the inner surface of the mold, cracking of the film and release of film from the mold. These undesirable phenomena result in a cast article having an uneven and greatly reduced abrasion resistance, optical distortion and a rugged or wrinkled surface which does not precisely reproduce the inner surface of the mold. Furthermore, it is very difficult to spread the partially polymerized product over the entire surface of the mold without leaving uncoated portions. The larger the mold the greater the difficulty. Also it is difficult to spread the partially polymerized product uniformly in thickness. A film lacking such uniformity of thickness results in the cast article having optical distortion. Therefore, these processes are inadequate for commercial scale production.

In order to obviate the above defects, some improvements have been recently proposed wherein a film-forming material such as diethylene glycol bisallylcarbonate (described in U.S. Pat. No. 3,465,076) or diacrylates and/or dimethacrylates (described in U.S. Pat. No. 3,518,341) is used.

These protective surface layers improve mar resistance of the base resin articles, as determined by the Falling Carborundum Testing Procedure in accordance with ASTM D-673-44, to some extent but never to any outstanding degree. Cast articles having such a surface layer become scratched when subjected to a severe abrasion test. For example, a methyl methacrylate resin article having a protective surface layer of poly-(diethylene glycol bisallylcarbonate) or polydimethacrylate such as poly-tetraethylene glycol dimethacrylate, as described in U.S. Pat. No. 3,465,076 and No. 3,518,341 respectively, receives some slight scratches when subjected to an abrasion test, particularly even when rubbed with a pad of steel wool of 0.014 mm diameter at a pressure of 0.1 to 0.5 kg/cm$^2$, although the scratch is far lesser than that of a methyl methacrylate resin article having no protective film surface layer, which become easily scratched at a pressure of 0.01 kg/cm$^2$.

An object of the present invention is, therefore, to provide a synthetic resin article having a synthetic resin surface layer, firmly adhered to the base resin, of greatly improved resistance to surface abrasion, particularly both mar resistance and scratch resistance.

In accordance with the present invention, there is provided a synthetic resin article having a synthetic resin surface layer, firmly adhered to the base resin, of greatly improved abrasion resistance characterized by said synthetic resin surface layer comprising a polymer or copolymer containing at least 40% by weight in polymerized form of at least one compound having a total of at least three acryloxy ($CH_2{=}CH{\cdot}CO{\cdot}O{-}$) and/or methacryloxy ($CH_2{=}C(CH_3){\cdot}CO{\cdot}O{-}$) groups in the molecule.

There is further provided a process for producing a synthetic resin article having a synthetic resin surface layer of greatly improved abrasion resistance, which comprises the steps of:

a. spreading onto all or part of the inner surface of a mold member a polymerizable material selected from (i) a compound having a total of at least three acryloxy and/or methacryloxy groups in the molecule, (ii) a monomer mixture comprising at least 40% by weight of said compound and at most 60% by weight of other copolymerizable monomers and (iii) a partially polymerized product of said compound or said monomer mixture, b. polymerizing the polymerizable material to an extent such that the polymerized material is not swollen with or dissolved into a monomeric material for base resin charged later thereinto, c. charging a mixture of the monomer for base resin and a polymerization initiator into the mold and then, polymerizing the monomer, and d. after the completion of polymerization, releasing the cast article from the mold.

There is further provided another process for producing a synthetic resin article, which comprises the steps of: (a') spreading a polymerizable material, defined in the step (a) of the preceding process, onto all or part of the surface of a synthetic resin shaped article and then, (b') polymerizing the polymerizable material.

A polymer prepared from the polymerizable material used as a protective surface layer-forming material in the present invention is too brittle to be singly made into a shaped article. But, in the case where a synthetic resin having a moderate impact resistance is combined as a base material with the protective surface layer-forming material, the two resins result, conjointly with each other, in a shaped article of high practical value.

In accordance with the most preferred embodiment of the process of the present invention, firstly, the surface layer-forming monomeric material is spread on the inner surface of a mold member together with a proper amount of polymerization initiator. To the spread material, a solid film having little or not affinity for the material is made to adhere closely in such a manner that no air bubble is left therebetween. Then, the monomer is polymerized to an extent such that the polymerized material is not swollen with or dissolved in a monomeric material for base resin. After peeling off the covered film from the polymerized material, the mold members are assembled into a mold. The mold is then filled with a mixture comprising a monomeric material for base resin and a polymerization initiator closed, and followed by heating to perform the polymerization. After the completion of the polymerization, the mold members are removed from the cast article.

Compounds having a total of at least three acryloxy and/or methacryloxy groups in the molecule, which are used as a surface layer-forming material of the present invention, are preferably prepared from polyhydric alcohol having at least three hydroxyl groups or its derivative and acrylic or methacrylic acid or its chloride or ester. Polyhydric alcohol residue, i.e. the residue joined to the acryloxy group and/or the methacryloxy group is preferably aliphatic hydrocarbon or its derivatives. Most preferable compounds used as a surface layer-forming material are those which have three or four acryloxy groups in the molecule, each group is joined with a hydrocarbon having at most 20 carbon atoms, particularly at most 10 carbon atoms.

Preferable polyhydric alcohols used in the preparation of the surface layer-forming material include, for example, trimethylolethane, trimethylolpropane, pentaerythritol, dipentaerythritol and the like. Particularly, acrylate compounds obtained from these polyhydric alcohols and acrylic acid result in a polymer exhibiting excellent abrasion resistance and superior weather resistance. Accordingly, the following compounds are enumerated as the most preferable surface layer-forming material: trimethylolethane triacrylate, trimethylolpropane triacrylate, pentaerythritol tetraacrylate and the like.

A synthetic resin article having a thin surface layer obtained from these compounds is far superior in mar resistance compared with one having a thin surface layer obtained from dimethacylate and the like, and does not become scratched at all when rubbed with a steel wool pad at a pressure of 1.0 to 3.0 kg/cm$^2$ in an abrasion test. Amongst others, a synthetic resin article having a surface layer obtained from the most preferable compound exhibits excellent scratch resistance, i.e. it does not receive scratches at all even when rubbed therewith at a high pressure of 5.0 kg/cm$^2$.

When these compounds are spread on the inner surface of a mold member, they may be used singly or in a mixture with each other or with other copolymerizable monomer, or as a partial polymerization product thereof.

In the case where the compound is used as a mixture with other copolymerizable monomer, the mixture should contain at least 40% by weight of the compound. When the mixture contains less than 40% by weight of the compound, the film resulting from the compound through polymerization tends to be swollen with a monomer for base resin and develop linear cracks thereon and consequently, the resulting cast article looks unattractive and does not have any greatly improved abrasion resistance compared with a non-laminated article made from the base resin. In some cases, another copolymerizable monomer is added to the above compound for the purpose of controlling the viscosity or imparting desirable physical properties to the film prepared therefrom, or when a solid material such as polymethyl methacrylate is intended to be dissolved in the compound. It should be noted however that the minimum amount of the other copolymerizable monomer used imparts the highest scratch resistance to the cast article. The copolymerizable monomer which is used together with the compound having a total of at least three acryloxy and/or methacryloxy groups, includes for example, monoethylenic unsaturated monomers such as acrylic acid, methacrylic acid or their esters and acrylonitrile, methacrylonitrile, styrene and their derivatives; and diethylenic unsaturated monomers such as glycol diacrylate, glycol dimethacrylate and the like.

As the polymerizable coating material tends to be inhibited from polymerizing by the presence of oxygen, the material is preferably treated in the absence of oxygen in order to perform the polymerization to a considerable degree. The polymerizable coating material may be polymerized in known manners, for example, by heating the reaction mixture containing a heat-decomposable polymerizaton initiator, or by applying ultraviolet rays to the reaction mixture containing photosensitizer, or applying $\gamma$ rays or other ionizing radiation.

A heat-decomposable polymerization initiator includes known radical polymerization initiators such as oil-soluble perioxides and azo compounds. A photosensitizer is preferably that which is capable of activating the polymerizable material at a wave length ranging 2,000 to 5,000 Å to produce the radical, and generally includes for example carbonyl compounds, azo compounds, peroxides, sulfur compounds, halogen compounds, quinone compounds and the like. These initiators may be used singly or in combination with each other. In the case where ionizing radiation is applied in order to initiate the polymerization, electron beams are irradiated at a total dose of 0.1 to 50 Mrad, using an accelerator having an acceleration voltage of 20 to 500 KV.

The polymerization conditions very depending upon the particular polymerizable material, the particular polymerization initiator and the concentration of initiator.

When the polymerizable material coated on the inner surface of a mold is once heated to perform the polymerization and thereafter cooled, the resulting brittle film sometimes tends to come off the surface of the mold, against which care should be, therefore, taken.

A monomer used for the preparation of the base resin of the present invention includes, for example, monomers for methacrylate resin, monomers for styrene resin, acrylonitrile, methacrylonitrile and the like. These monomers may be used singly or in a mixture with each other or with another copolymerizable and castable monomer as a minor ingredient, or a partially polymerized product thereof. Such comonomers include for example acrylic acid, methacrylic acid, styrene and their derivatives. The cast article of the present invention may also comprise a synthetic resin made from unsaturated polyester resin as a main ingredient, such as those prepared by the condensation between phthalic acid, maleic acid, etc. and ethylene glycol, propylene glycol, etc. As a polymerization initiator for the monomer, known radical initiators such as oil-soluble peroxides and azo compounds may generally be used. In particular, azobisisobutyronitrile, benzoylperoxide, etc. are preferable.

The process for producing the synthetic resin case article of the present invention is now illustrated in detail:

A mixture of the polymerizable surface-layer forming material and a polymerization initiator is coated on the inner surface of mold members in a manner such that the mixture is spread uniformly in thickness and no air bubbles are left therein. The coating may be effected by spraying, brushing, flowing or dropping the mixture on the surface of conventional mold members made of, for example, stainless steel, nickel and chrome-plated metal, aluminum, inorganic glass and the like. Then, a film having little or no affinity for the polymer produced from the coated material is made to adhere closely to the coated material while ensuring that no air bubbles are left therebetween, in order to prevent the polymerizable material from coming into contact with oxygen. Then, the polymerizable material is polymerized to an extent such that the polymerized material is not swollen with or dissolved in a monomer for the base resin charged later therein. It would be possible for the purpose of polymerization only to keep the mold members whereon the polymerizable material is coated, in an inactive gas atmosphere to prevent the material from coming into contact with oxygen thereby, without the use of the film. However, the process involving the use of such a covering film is far more advantageous because not only is the influence of oxygen excluded but also the coated material is completely prevented from agglomerating into the form of drops either immediately after coating or during polymerization. Therefore, the process involving the use of a film is very valuable from an industrial viewpoint and particularly suitable for the production of large size articles. In accordance with the present invention, no extender is required to be added and hence there are no disadvantages derived from the addition of same. It is preferred that the film is subjected to tension after being made to adhere closely to the polymerizable material and maintained in the same state until the completion of polymerization, in order to form a coated surface layer having a smooth surface. The resulting cast article exhibits no optical distortion, which distortion results from the difference in refractive index between the surface resin layer and the base resin layer. In the case where a heat-shrinkable film is used, the above effect can easily be achieved merely by heating.

The film to be made to adhere closely to the coated material may be suitalbly selected depending upon the particular polymerization method. In general, preferably films include those of polyester, polyvinyl alcohol, regenerated cellulose (cellophane or moisture-proof cellophane), polyethylene, polypropylene, polyvinyl chloride, polyvinylidene chloride, polyamide, teflon, cellulose diacetate, cellulose triacetate and the like. In the case where the polymerization is performed by heating, and irradiation by ultraviolet rays and electron beams, those of polyester; those of polyester, cellophane, polyvinyl alcohol, polypropylene, polyvinyl chloride and the like; and those of polyester are preferable, respectively. These films have little or no affinity for the polymerizable coating material employed in the present invention and the polymerization product thereof. Therefore, when the film is peeled off after the completion of polymerization of the coated material, a thin layer of the polymerization product does not come off from the surface of the mold.

In order to control the adhesion of the coated material to the surface of a mold, a minor amount of a compound selected from releasing agents such as Aerosol-OT (made by American Cyanamid Co., the main ingredient being sodium dialkylsufosuccinate) and liquid paraffin, various organic and inorganic acids and hydroxy compounds may be added to the coating material. Other additives such as antistatic agent, ultraviolet absorber, colorant and the like may also be added. The coating material may preferably be spread in a thickness approximately ranging from 0.001 mm to 1.0 mm, most preferably from 0.005 mm to 0.1 mm.

Polymerization of the material coated on the inner surface of a mold member is performed in the manner mentioned hereinbefore with due regard to polymerization conditions such as the composition of the coated material, the particular catalyst and the amount of catalyst used, thickness of the layer of the coated material, etc.

The coated material should be sufficiently polymerized, i.e. to such an extent that the polymerized material is not swollen with or dissolved in the monomer for the base resin. When the coated material is not sufficiently polymerized, i.e. a thin layer of the polymerized material is in a gel state or in a state such that the thin layer is swollen with the monomer for the base resin, the resulting cast article has a rugged or wrinkled surface because the thin layer of the polymerized material becomes cracked or comes off from the inner surface of the mold during the polymerization of the monomer for the base resin, or the cast article lacks uniformity in optical properties and is inferior in abrasion resistance because the thin layer is buried in the base resin. These defects are particularly, fatal to a transparent cast article such as of for example polymethylmethacrylae.

In accordance with the present invention, even when the coated material is polymerized to a great degree, the adhesion of the surface thin layer to the base resin is still high. Therefore, the thin layer does not peel off from the base resin when a cast article is subjected to a cross cut adhesive cellophane tape test. The test is carried out by using a needle, in such a manner that the surface layer is scarred, to a depth such as to break the film, with a pair of 11 lines intersecting at right angles to each other to form a 1 cm$^2$ square containing 100 pieces of 1 mm$^2$ squares, an adhesive cellophane tape is applied to said 1 cm$^2$ square and is then peeled off at the same time from the surface, and the state of the peeled surface film is examined to judge the extent of adhesion of the surface layer.

The mold members, on the inner surface of which a thin layer thus formed by polymerization of the coated material is closely adhered, are assembled into a mold wherein the inner surface of the mold members stand face to face with each other. In the present invention, the most preferably mold member is a tempered plate glass.

A process for spreading a polymerizable material and polymerizing the same to form a surface layer of excellent abrasion resistance on a mold member may be carried out in a continual manner. A continual process is far advantageous from an industrial viewpoint because the process reduces labour requirements and ensures stable properties of the resulting surface layer and therefore, permits mass production.

A preferably process and apparatus for continual production will be illustrated in detail with reference to the drawing.

Figure 1:
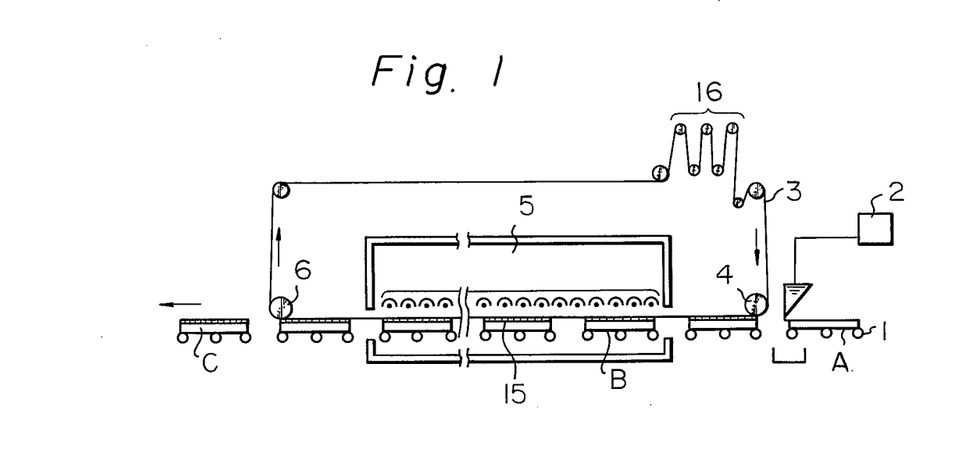

FIG. 1 shows one preferable embodiment of the apparatus. In FIG. 1, a plurality of mold members A such as made of tempered plate glass are continuously moved in a row at stated intervals while being supported by a conveyor means 1 such as rollers or a belt. A polymerizable material is fed from a reservoir 2 through a metering pump and uniformly spread onto the mold member A by a suitable means such as a roller coater, a flow coater or a spray. Then, an endless polymer film 3 which continuously moves at the same speed as that of the mold member is caused to closely adhere to the spread surface by press roller 4 having a surface layer of sponge-like soft rubber. At the same time, the thickness of the spread material is made uniform and air bubbles are forced out from the material by the press roller 4. In order to force out the air bubbles completely and to prevent the mold member from remaining partially uncoated, it is preferable to first overspread the material onto the mold member and then press out the excess material by the press roller. But, the material may be firstly spread onto a film and then caused to adhere closely to the mold member, which process depends upon the viscosity of the material, inclination of the surface of the mold member and the method whereby the film is made to adhere closely to the mold member. The mold member B having the spread material thereon is then moved into a polymerization chamber 5 where the material 15 between the mold member and the film is polymerized to an extent such that the polymerized material is not swollen with or dissolved into a monomer for base resin to be charged later thereon. The polymerization chamber 5 may be ventilated to control the temperature and to discharge harmful gas. In the first zone ranging from the point at which a polymer film is made to adhere closely to the mold member to the point at which the polymerization is in an advanced stage, i.e. the film, the polymerized material and the mold member are fixed with each other, the film tends to become creased and, on rare occasions, air penetrates from the circumference of the mold member due to a slight disturbance in alignment between the continuous film and the mold members arranged in a row at stated intervals, and results in a cast plate having a rugged surface and therefore reduced optical, mechanical and thermal properties. Therefore, it is preferred in the above first zone to stretch the film in the lateral direction by grasping it at both edges by a tensioning device and in the longitudinal direction by applying a slight brake force to the feed roller and to adjust the balance between the tensions in both directions. In the case where a heat-shrinkable film is used, the tension is readily generated merely by firmly grasping both the edges and heating the film.

After the polymerization is completed, the polymer film 3 is continuously peeled off from the polymerized material closely adhering to the mold member, by a take-up roller 6. In the example shown in FIG. 1, the endless file 3 continuously circulates by way of tensioning rollers 16 to the first spreading zone. But, the film may be fed from a feed roller to a winding roller. A device for removing stains and creases from the film my be attached to the continuous production apparatus.

In the above process, all the mold members should have the same width, but need not have the same length. It is possible to decrease the distance between the adjacent mold members. The conveyor may be driven in a continuous manner as illustrated above or in an intermittent manner. In the latter case, the conditions regarding the polymerization apparatus may be synchronized with the conveyor movement.

A mixture of a monomer for base resin and a polymerization initiator is then charged into the mold. The most preferable monomer for base resin to be used in the present invention is methyl methacrylate or a monomer mixture containing at least 70% by weight of methyl methacrylate. These may be used as a partial polymerization product. As comonomers to be preferably used in admixture with methyl methacrylate, methacrylic acid, lower alkyl esters of methacrylic acid and acrylic acid, styrene and the like are suitable. To the mixture of the monomer for base resin, additives such as plasticizer, fire retardant, rubber, colorant, ultraviolet absorber, etc. may be added, if desired.

The polymerization of the monomer for base resin is usually carried out at a temperature of 30° to 150° C in the well-known manner as described for example in U.S. Pat. No. 3,087,197. After the completion of polymerization, the mold is released to obtain a synthetic resin cast plate having a synthetic resin thin surface layer of excellent abrasion resistance. The surface of the cast plate reproduces precisely the inner surface of the mold member and is not rugged or wrinkled. Therefore, the mold can be readily released from the cast plate.

In accordance with one preferable embodiment of the present invention, a synthetic resin cast article is continuously produced using continuous production equipment. A continuous production equipment principally comprises an apparatus for polymerizing a monomeric material for base resin comprising a pair of endless belts as a mold member. At one end of the endless belts which are facing each other and continuously moving, the monomeric material for base resin is charged therebetween and polymerized while the endless belts move and, at the other end of the endless belts, a platelike synthetic resin cast article is detached therefrom. In addition to the apparatus for polymerizing a monomeric material for base resin, the continuous production equipment preferably comprises an apparatus for forming a solid synthetic resin surface layer of excellent abrasion resistance on at least one surface of the two endless belts before the monomeric material for base resin is charged between the endless belts.

The main part of the apparatus for polymerizing a monomeric material for base resin comprises endless belts, pulleys, a tension-generating means, a driving means a monomer-feeding means, a gasket-feeding means, a heating means for polymerizing the monomeric material for base resin and controlling the thickness of the polymerized material, and a supporting means. The main part of the apparatus for forming a solid synthetic resin surface layer comprises a means for spreading a polymerizable material, a means for making the spread material harden and, if desired, a means for preventing the spread material from coming in contact with oxygen.

In the practice of continuous production, a polymerizable material and, if required, a polymerization initiator are uniformly spread onto at least one surface of the two endless belts by a suitable spreading means such as a roll coater, a flow coater, a spray, a brush or the like. The spread material is then polymerized, preferably in a state such that the material is prevented from coming in contact with oxygen. In order to prevent the spread material from coming in contact with oxygen, it is preferred to place a part of the endless belts continuously moving, in an atmosphere of inert gas. However, this method offers several problems e.g. a perfect seal between the belt and the sealing member is very difficult, and the volatile compound contained in the spread material inevitably evaporates, and a great amount of inert gas is required. These factors make the production apparatus complicated. Therefore, it is advantageous to make the film having little or no affinity for the spread material adhere closely thereto.

The step of forming the synthetic resin layer of excellent abrasion resistance is usually carried out on a horizontal part of the endless belt. However, this step may be carried out on the part where the endless belt moves slopewise, depending upon the viscosity and the thickness of the material to be spread thereon and upon whether a film is used to prevent the material from coming in contact with oxygen or not. In the latter case, as the synthetic resin layer so formed has a high cross-linking density and is brittle, the layer sometimes peels off from the belt or forms cracks therein due to deformation and bending of the belt. Therefore, care should be taken regarding the curvature of pulleys and rollers supporting the belt or change of the temperature thereof.

The step of polymerizing the monomeric material for base resin is carried out in the following manner. A pair of endless belts continuously moving at the same speed as each other, each one surface of the pair of belts on which a synthetic resin layer of excellent abrasion has formed facing the other and continuously moving in the same direction, and two gaskets located at the border of both the endless belts and in contact with both endless belts are assembled into a polymerization cell. Through an opening located at one end of the polymerization cell, a liquid monomeric material for base resin is continuously charged into a space defined by the polymerization cell. After the monomer is continuously polymerized with the distance between the two surfaces of the endless belts being maintained constant, the polymerized material is continuously peeled off from the two belts at an opening located at the other end of the polymerization cell. The resulting synthetic resin cast plate has surface layers of excellent abrasion resistance, firmly adhered to the base resin.

Instead of spreading the polymerizable material onto both surfaces of the pair of the endless belts, it is also possible to spread the material onto either one surface of each of the two belts thereby producing a cast plate having only one surface layer of excellent abrasion resistance.

A preferable endless belt is that which is made of metal such as steel and stainless steel and having a thickness of 0.1 to 3 mm, particularly 0.5 to 2 mm. An endless belt made of burnished stainless steel is most preferable because it produces a cast plate having an attractive appearance. A liquid monomeric material for base resin may be directly poured through a feed duct inserted at the opening of the polymerization cell or through a dropping funnel onto the endless belt.

In general, a gasket used in this process is made of plastic and in the form of a rod or tube. But, a gasket having a square or rectangular cross section may be used, particularly in the case where a monomeric material for base resin having a low viscosity is used, to ensure a perfect seal between the gasket and the belts. A hollow tubular gasket may be used in the case where a monomer-polymer mixture for base resin having a high viscosity is used.

The polymerization temperature may be maintained constant all over the polymerization zone or varied step by step or in a continuous manner. The polymerization temperature varies depending upon the particular polymerization initiator, but is should be maintained below the boiling point of the monomer until the greater part of polymerization is completed. After the completion of the greater part of polymerization, it is advantageous to raise the temperature considerably, but not to the temperature at which degradation of the polymer occurs, to complete the polymerization. The heating of the polymerization zone may be carried out, for example, by blowing hot air against the outside, by spraying hot water on the outside, by making the belts travel through a hot water bath or by using an infrared heater.

In order to keep the surfaces of the endless belt smooth and horizontal and control the thickness of the resulting cast plate at the polymerization zone, a plurality of idle rollers may be provided to support the belt or the belt may be made to slide on a smooth solid surface.

The apparatus and process for continuously producing a synthetic resin cast article will be illustrated in detail with reference to the drawing.

Figure 2:
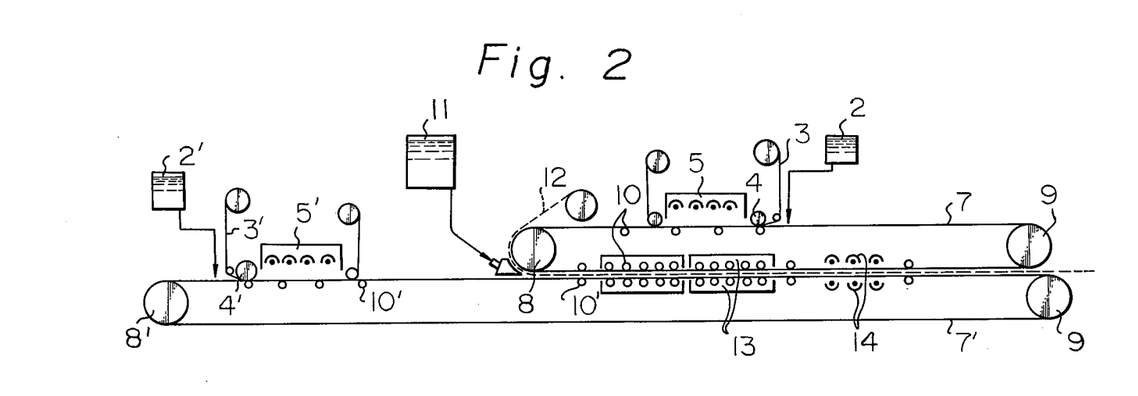

FIG. 2 is one preferable embodiment of the apparatus. In FIG. 2, a pair of endless belts 7, 7' continuously moving at the same speed as each other while being stretched by pulleys 8, 9, and 8', 9', are kept horizontal by a plurality of idle rollers 10, 10'. Two polymerizable materials for surface layers are separately fed from reservoirs 2, 2' through metering pumps (not shown in FIG. 2) and spread onto the surfaces of the belts 7, 7', respectively. Two polymer films 3, 3' continuously moving at the same speed as those of the belts 7, 7' are separately caused to closely adhere to the spread surfaces by press rollers 4, 4' each having a surface layer of sponge-like soft rubber, respectively. At the same time, the thickness of the spread material is made uniform and air bubbles are forced out from the material by the press rollers 4, 4'. The films 3, 3' are continuously drawn out from two feed rollers, respectively. The films made to closely adhere to the spread surface are uniformly stretched in the longitudinal direction by applying a slight braking force to the feed rollers and in the lateral direction by a tenter. The spread materials are polymerized in order to become hard by being passed through hardening apparatus 5, 5'. Then, the films are peeled off from the polymerized materials each closely adhering to the belt surface.

A monomeric material for base resin is fed from a reservoir 11 through a metering pump (not shown in FIG. 2) and an injector into the space between the belt surfaces onto which the polymerized materials have closely adhered, and at the same time, gaskets 12 are fed between both edges of the belts 7, 7' to seal the edge of the belts. The first half part 13 of the polymerization zone is heated by spraying hot water onto the outside and the second half part thereof is heated by far infrared heaters 14 and hot air heaters. At the end of the belts, the cast plate having a surface layer of improved abrasion resistance is continuously peeled off from both belts.

In accordance with another preferable embodiment of the present invention, a synthetic resin article of excellent resistance to surface abrasion can be obtained without the use of a mold by a process comprising the steps of directly spreading a polymerizable coating material, which is the same as that described above, onto all or part of the surface of a synthetic resin shaped article which has previously been manufactured, and then polymerizing the polymerizable material, preferably in such a way that the material is prevented from coming into contact with oxygen. This process can be carried out simply, but is inferior in the point only that smoothness of the entire surface of the resulting article is not obtainable. In this process the choice of the polymerizable coating material, method of coating the surface of a shaped article therewith, method of preventing contact with oxygen and method of polymerizing the coated material may also be performed in the same manner as that described involving the use of a mold.

Shaped articles to be used in this process include, for example, those of thermoplastic resins such as polymethyl methacrylate, polystyrene, acrylonitrile-styrene resin, acrylonitrile-butadiene-styrene resin, polycarbonate, polyamide, polysulfone and the like, and those of thermosetting resin such as epoxy resin, alkyd resin, phenol resin, melamine resin, urea resin and the like. Most preferable shaped articles are those of transparent resins such as polymethyl methacrylate, polycarbonate, polystyrene and the like.

In order that the invention may be more fully understood, the following examples are given by way of illustration only, and are not intended to limit the scope of the invention.

In the examples, mar resistance represented by a mar value is determined by the following procedure:

A test specimen is clipped at an incline of 45 degrees to the horizontal direction and rotated at a speed of 11 r.p.m. around a vertical axis. 300 g of 60 mesh carborundum particles are dropped at a rate of 150 g/min from a hopper located at a height of 70 cm above the specimen. The mar value is expressed as the value of the difference between the hazes after the dropping of carborundum particles and before the dropping thereof, wherein the haze is calculated by the equation;

$$\text{Haze (\%)} = \frac{\text{Total luminous transmittance} - \text{Parallel luminous transmittance}}{\text{Total luminous transmittance}} \times 100$$

In the following examples, all the percentages and parts are by weight except mar value.

EXAMPLE 1

100 parts of trimethylolpropane triacrylate were mixed with 2 parts of benzoin methyl ether as photosensitizer and flowed and extended on one surface of a glass plate. The layer thus formed was covered with a polypropylene film of 0.018 mm thickness. The polypropylene film was pressed with a roller so that no air bubbles were left between the film and the glass plate, and the thickness of the layer was made approximately 0.03 mm. Using an irradiation apparatus with 20 watt chemical lamps of approximately 58 cm length having a dominant wave length of approximately 3650A arranged at 5 cm intervals, the trimethylolpropane triacrylate layer was irradiated at a distance of 7 cm directly below the chemical lamps for 4 minute to perform polymerization. Then, the polypropylene film was stripped off therefrom, and only the completely polymerized trimethylolpropane triacrylate layer was left to adhere to the surface of the glass plate.

Two sheets of the glass plate thus prepared were made to stand so that the two polytrimethylolpropane triacrylate layers were face to face with each other, and the space between the two glass plates were filled with a partially polymerized methyl methacrylate syrup containing 0.05% of azobisisobutyronitrile (referred to hereinafter as AIBN for brevity). After sealing the circumference of the glass plates with a plasticized polyvinyl chloride gasket, the interval between the two glass plates was adjusted to 3 mm. Thereafter, the polymerization cell was heated at a temperature of 60° C for 6 hours and further at a temperature of 120° C for 2 hours to perform polymerization. After cooling the cell, the resultant methyl methacrylate resin cast plate was released from the glass plates. The thin polytrimethylolpropane triacrylate layers came off from the glass plates, i.e.they had been firmly adhered to the methyl methacrylate resin cast plate. The methyl methacrylate resin cast plate had attractive surfaces free from wrinkles, unevenness and optical distortion.

The mar value of the cast plate thus manufactured was 11%, whereas that of a mthyl methacrylate resin cast plate manufactured in the same manner except that such a synthetic resin surface layer was not adhered thereto was 55%.

EXAMPLE 2

A mixture of 80 parts pentaerythrithol tetraacrylate and 20 parts methyl methacrylate was mixed with 1.5 parts of benzoin methyl ether and 0.2 part of AIBN, and flowed and extended on one surface of a burnished steel plate. The layer thus formed was covered with a polypropylene film of 0.018 mm thickness. The polypropylene film was pressed with a roller, pressing out air bubbles from the layer, so that the polypropylene film was made to adhere closely to the layer and the thickness of the layer was made approximately 0.02 mm. Using the same iradiation apparatus and under the same conditions as those of Example 1, ultraviolet rays were applied to the layer for 4 minutes to perform polymerization. The polypropylene film was then stripped off therefrom, and only the completely polymerized resin layer was left to adhere onto the surface of the steel plate.

Two sheets of the steel plate thus prepared were made to stand so that the two thin resin layers were face to face with each other, and the space between the two steel plates was filled with a partially polymerized methyl methacrylate syrup containing 0.05% of AIBN. After sealing the circumference of the steel plates with a plasticized polyvinyl chloride gasket, the interval between the two steel plates was adjusted to 3 mm. Thereafter, the mold was heated at a temperature of 60° C for 6 hours and further at a temperature of 120° C for 2 hours to perform polymerization. After cooling the mold, the resultant methyl methacrylate resin cast plate was released from the steel plates. The thin resin layers came off from the steel plates, i.e. they had been firmly adhered to the methyl methacrylate resin cast plate. The cast plate had attractive surfaces free from wrinkles, unevenness and optical distortion. The mar value of the cast plate was 13%.

EXAMPLE 3

A mixture of 60 parts timethylolethane triacrylate and 40 parts of polyethylene glycol dimethacrylate (The average molecular weight of polyethylene glycol used was 600.) was mixed with 2 parts of benzoin ethyl ether, and flowed and extended on one surface of a glass plate. The layer thus formed was covered with a polyester film of 0.025 mm thickness. The polyester film was pressed with a roller so that no air bubbles were left between the film and the glass plate, and the thickness of the layer was made approximately 0.03 mm. Using the same iradiation apparatus and under the same conditions as those of Example 1, the thin layer was irradiated for 4 minutes to perform the polymerization. The polyester film was then stripped off therefrom and only the completely polymerized resin layer was made to adhere onto the surface of the glass plate.

Two sheets of the glass plate so prepared were made to stand so that the two resin layers were face to face with each other, and the space between the two glass plates was filled with partially polymerized product of a mixture of 90 parts methyl methacrylate and 10 parts methyl acrylate, which product contained 0.05% of AIBN. After sealing the circumference of the glass plates with a plasticized polyvinyl chloride gasket, the interval between the two glass plates was adjusted to 3 mm. Thereafter, the mold was heated at a temperature of 60° C for 6 hours and further at a temperature of 120° C for 2 hours to perform polymerization. After cooling the mold, the resultant methyl methacrylate-methyl acrylate resin coat plate was released from the glass plates. The thin resin layers had been firmly adhered to the resin cast plate. The resin coat plate so manufactured had attractive surfaces free from wrinkles, unevenness and optical distortion. The mar value of the resin cast plate was 12%, whereas that of a coat plate manufactured from the same resin in the same manner as the above except that such a thin resin layer was not adhered thereto was 57%.

The above procedure was repeated wherein two sheets of glass plate, one of which had the some thin resin layer, adhered thereto, as that described above and the other of which had no thin resin layer, were made into a polymerization cell with all other conditions remaining the same. Thus, a resin cast plate exhibiting a greatly improved resistance to surface abrasion on only one side thereof could be obtained.

EXAMPLE 4

Trimethylolpropane triacrylate was spread over one surface of a steel plate. The layer thus formed was covered with a polyester file of 0.025 mm thickness. Then, the polyester film was pressed with a roller so that no air bubbles were left between the film and the steel plate, and the thickness of the layer was made approximately 0.02 mm. Using a 300KV electron beam accelertor, the thin layer was irradiated with electron beams at a dose rate of 5.6 M rad/sec and a total absorbed dose of 16 M rad to perform the polymerization. The polyester film was then stripped off therefrom.

Two sheets of the steel plate so treated were made to stand so that the two resin layers were face to face with each other to form a polymerization cell. Using the polymerization cell, a methyl methacrylate resin cast plate was prepared in the same manner as that described in Example 2. The mar value of the methyl methacryate resin cast plate was 10%.

EXAMPLE 5

A mixture of 40 parts trimethylopropane triacrylate and 60 parts methyl methacrylate was mixed with 0.2 part of AIBN and 0.05 part of Tinuvin P (ultraviolet absorber made by Geigy, Swiss), and flowed and extended on one surface of a glass plate. The layer thus formed was covered with a polyester film of 0.025 mm thickness. The polyester film was pressed with a roller so that no air bubbles were left between the film and the glass plates, and the thickness of the layer was made approximately 0.02 mm. The glass plate thus treated was heated at a temperature of 70° C for one hour and further at a temperature of 100° C for 2 hours, in an air over to polymerize the monomer mixture. The polyester film was then stripped off therefrom and only the completely polymerized resin layer was made to adhere onto the surface of the glass plate.

Two sheets of the glass plate so treated were made to stand so that the two resin layers were face to face with each other to form a polymerization cell. Using the polymerization cell, a methyl methacrylte resin cast plate was prepared in the same manner as that described in Example 1. The resultant methyl methacrylate resin cast plate had attractive surfaces free from wrinkles, unevenness and optical distortion, and the mar value of 21%.

EXAMPLE 6

The procedure of Example 1 was repeated wherein a mixture of 70 parts of pentaerythritol tetraacrylate, 25 parts of 1,6-hexanediol diacrylate, 5 parts of 2-hydroxyethyl methacrylate and 1 part of benzoin methyl ether was used as a polymerizable coating material for thin surface layers with all other conditions remaining the same. The methyl methacrylate resin cast plate thus manufactured had attractive surfaces free from wrinkles, uneveness and optical distortion, and the mar value of 9.0%.

A steel wool test was made on the methyl methacrylate resin cast plate and other resin cast plates manufactured in Examples 1 – 5. Results are collectively shown in Table 1.

Table 1

| Example 1 | Very good |
| Example 2 | Excellent |
| Example 3 | good |
| Example 4 | Very good |
| Example 5 | Fair |
| Example 6 | Excellent |
| Comparative Example 1* | Fair–Poor |

*For comparison purposes, the process described in U.S. Pat. No. 3,518,341, Example 1 was repeated wherein tetraethylene glycol dimethacrylate was used as a surface layer-forming material.

EXAMPLE 7 – 10

The procedure of Example 1 was repeated wherein the various monomers for base resin and polymerization conditions of the monomers were employed as shown in Table 2 with all other conditions remaining the same. All the resin cast plates thus manufactured had attractive surfaces free from wrinkles, unevenness and optical distortion, and the mar value of 10 to 11%.

Table 2

| | Example No. | | | |
|---|---|---|---|---|
| Conditions | 7 | 8 | 9 | 10 |
| Base resin composition, in | MMA*1 90, Methacrylic acid 10 | MMA 75, Phosgard C-22-R*2 | MMA 70, Styrene 30 | Styrene 70, Acrylo- |

Table 2-continued

| Conditions | Example No. | | | |
|---|---|---|---|---|
| | 7 | 8 | 9 | 10 |
| parts | | 25 | | nitrile 30 |
| Polymerization initiator for base resin, in parts. | AIBN 0.05 | AIBN 0.1 | AIBN 0.05 | AIBN 0.1 |
| Polymerization conditions, temp., in °C × time, in hours | 60° C × 20h + 120° C × 2h | 60° C × 16h + 100° C × 2h | 50° C × 16h + 120° C × 2h | 50° C × 20h + 110° C × 2h |
| Mar value of base resin, *3 in percent | 52 | 68 | 66 | 72 |

*1 MMA: Methyl methacrylate
*2 Phosgard C-22-R: Flame retardant agent made by Monsanto Chem.
*3 Comparative data (mar value of a base resin cast plate having no polytrimethylolpropane triacrylate surface layer)

EXAMPLE 11

Trimethylolpropane triacrylate was uniformly spread at a thickness of approximately 0.02 mm over one surface of a polymethyl methacrylate base plate having a 5 mm thickness. The surface of polymethyl methacrylate plate thus treated was irradiated with electron beams at a dose rate of 5.6 M rad/sec and a total absorbed dose of 16 M rad using a 300 KV electron beam accelerator to polymerize the trimethylol propane triacrylate.

The resultant plate exhibited an excellent mar resistance, and stracth resistance determined in accordance with a steel wool test. Adhesion of the thin trimethylolpropane triacrylate resin layer to the base plate was very strong.

EXAMPLE 12

A mixture of 70 parts of pentaerythritol tetraacrylate and 30 parts of 1,6-hexanediol diacrylate was uniformly spread at a thickness of approximately 0.02 mm over one surface of a polycarbonate base plate and one surface of a polystyrene base plate, both plates having a 2 mm thickness. The surfaces of both the plates thus treated were irradiated in the same manner as that of Example 11.

Both the plates thus treated exhibited an excellent mar resistance and scratch resistance. Adhesion of the thin resin surface layer to both the base plates was very strong.

EXAMPLE 13

A synthetic resin surface layer was formed on a tempered glass plate in accordance with the process illustrated in FIG. 1. Tempered glass plates each having a thickness of 10 mm, a width of 1,420 mm and a length of 1,168 mm were continuously moved at a speed of 0.5 m/min by a conveyer with distances between the adjacent glass plates of approximately 150 mm.

A mixture of 60 parts of trimethylolpropane triacrylate, 30 parts of bis-(ethylene glycol) phthalate dimethacrylate, 10 parts of methyl methacrylate, 2 parts of benzoin methyl ether and 0.1 part of AIBN was continuously flowed through a metering pump and spread onto the glass plate (A). A polyester film 3 having a thickness of 0.018 mm and a width of 1,600 mm, while being stretched by a clip tenter and moved at the same speed as that of the glass plate, was made to closely adhere to the spread surface by a press roller 4 in a manner such that the spread material had a uniform thickness of approximately 0.03 mm and air bubbles were forces out from the spread material. Then, the spread material was passed through a polymerization zone where chemical lamps having a dominant wave length of approximately 3650A were arranged at a height of approximately 70 cm from the spread surface extending over 3 m, to be hardened thereby. Then, the polyester film was peeled off from the polyester film was peeled off from the polymerized material.

Two sheets of the glass plate so treated were stood so that the two resin layers were face to face with each other, and the space between the two glass plates was filled with a partially polymerized product of methyl methacrylate which product contained 0.05% of AIBN. After sealing the circumference of the glass plates with a plasticized polyvinyl chloride gasket, the distance between the two glass plates was adjusted to 3 mm. Thereafter, the mold was heated at a temperature of 60°C for 6 hours and at a temperature of 120°C for a further 2 hours to perform polymerization. After cooling the mold, the resultant methyl methacrylate resin cast plate was released from the glass plates. The thin resin layers had firmly adhered to the base resin. The cast plate had attractive surfaces free from wrinkles, unevenness and optical distortion. The mar value of the case plate was 13%.

EXAMPLE 14

An apparatus shown in FIG. 2 was used. Two burnished stainless steel endless belts 7, 7' each having a thickness of 1 mm and a width of 1,200 mm were continuously moved, while being stretched by the main pulleys 8, 9 and 8', 9' each having a diameter of 1,500 mm respectively, at a speed of 0.5 m/min by driving the main pulley 9'. The lower belt 7' was 10 m longer than the upper belt 7. The initial tension, 10 kg per mm² of cross-sectional area of the belt, was applied by oil pressure cylinders provided in the main pulleys 8, 8'.

Two mixtures of 60 parts of trimethylolpropane triacrylate, 30 parts of bis-(ethylene glycol) phthalate dimethacrylate, 10 parts of methyl methacrylate, 2 parts of benzoin methyl ether and 0.1 part of AIBN were continuously flowed through metering pumps and spread onto both surfaces of the two endless belts 7, 7', respectively. Polyester films 3, 3' of 0.012 mm thickness, while being stretched by clip tenters and moved at the same speed as those of the endless belts, were continuously drawn out from the feed rollers and made to closely adhere to the spread surfaces at the same speed as those of the endless belts by press rollers 4, 4' in a manner such that the spread material had a uniform thickness of approximately 0.03 mm and air bubbles were forced out from the material. Then, each of the spread materials passed through a polymerization zone where chemical lamps having a dominant wave length of approximately 3650A were arranged at a height of approximately 70 cm from the belt surface and at 5 cm intervals extending over 3 m, to be hardened thereby. Then, the films were continuously peeled off from the polymerized materials each closely, adhering to the belt surface and taken up by winding rollers. The belts were suitably supported by a plurality of idle rollers 10, 10' arranged extending over the zones where surface layers of the polymerized material were formed.

Then, a monomer mixture containing 80 parts of methyl methacrylate, 20 parts of polymethyl methacrylate having a polymerization degree of approximately 900 and 0.02 part of azobisdimethylvaleronitrile was continuously fed from a metering pump through an injection device into the space between the belt surfaces onto which the polymerized materials was adhered. At the same time, hollow tubular gaskets 12 made of polyvinyl chloride resin containing an appropriate amount of plasticizer were fed between both edges of the belts 7, 7'. The polymerization zone was extended over 60 m, at the first 40 m part of which a plurality of idle rollers 10, 10' were arranged at 300 mm intervals to control precisely the distance between the belt surfaces facing each other and heating was performed by spraying water of 70° C from a nozzle onto the outside, and at the second 20 m part of which a plurality of idle rollers 10, 10' were arranged at 2 m intervals to support the belt and the belt was heated at a temperature of approximately 120°C using an infrared heater and a hot air oven. After being cooled, a cast plate of 3 mm thickness was continuously peeled off from the belts, which has no optical distortion and a smooth surface layer of excellent abrasion resistance closely adhered to the base resin. The mar value of the cast plate was 13%.

What we claim is:

1. In a process for producing a synthetic resin article having a synthetic resin surface layer firmly adhered to a resin and having greatly improved resistance to surface abrasion; said process comprising the steps of:
    a. spreading onto all or part of the inner surface of a mold member a polymerizable material selected from the group consisting of (i) a compound having a total of at least three acryloxy ($CH_2=CH\cdot CO\cdot O$-) and/or methacryloxy ($CH_2=C(CH_3)\cdot CO\cdot O$-) groups in the molecule, (ii) a monomer mixture comprising at least 40% by weight of said compound and at most 60% by weight of other copolymerizable ethylenically unsaturated monomer and (iii) a partially polymerized product of said compound or of said monomer mixture,
    b. adhering a preformed film having little or no affinity for said polymerizable material closely to the spread surface,
    c. polymerizing said polymerizable material to an extent such that the polymerized material can not be swollen with or dissolved into a monomer for the base resin to be charged into said mold member,
    d. removing the film from the polymerized material,
    e. charging a mixture of the monomer for the base resin and a polymerization initiator into the mold,
    f. polymerizing the monomer, and
    g. after the completion of polymerization, releasing the cast article from the mold, the improvement comprising upstream of a polymerization zone wherein said polymerizable material is polymerized while passing therethrough, coating said polymerizable material onto the surface of at least one of two horizontal upper and lower endless belts continuously traveling at the same speed and in the same direction and applying a continuous length of said film onto the polymerizable material on the continuously traveling endless belts whereby said length of film is closely adhered onto the coated polymerizable material; downstream of the polymerization zone, continuously removing said length of film from the polymerized material on said endless belts; and continuously charging said monomer mixture for the base resin into an upstream end of a casting space defined by the two opposed, horizontal upper and lower polymerized material-coated belt surfaces and side seals.

2. A process according to claim 1 wherein said film is an organic polymer film.

3. A process according to claim 1, wherein said film is a polyester film.

4. A process according to claim 1 wherein said film is selected from the group consisting of films of polyethylene, polypropylene, polyvinyl alcohol and its acetalized products, polyvinyl chloride and cellulose.

5. A process according to claim 1 wherein said polymerized material on the surface of the mold has a thickness of 0.001 mm to 1.0mm.

6. A process according to claim 1 wherein said compound has a total of at least three acryloxy ($CH_2=CH\cdot CO\cdot O$-) and/or methacryloxy ($CH_2=C(CH_3)\cdot CO\cdot O$-) groups in the molecule, each group being joined with a hydrocarbon having at most 20 carbon atoms or its derivatives.

7. A process according to claim 6 wherein said compound having a total of at least three acryloxy and/or methacryloxy groups in the molecule is selected from the group consisting of trimethylolethane triacrylate, trimethylolpropane triacrylate and pentaerythritol tetraacrylate.

8. A process according to claim 1 wherein said monomer is methyl methacrylate or is a monomer mixture containing at least 50% by weight of methyl methacrylate.

9. In a process for producing a synthetic resin article having a synthetic resin surface layer firmly adhered to a resin and having greatly improved resistance to surface abrasion; said process comprising the steps of:
    a. spreading onto all or part of the inner surface of a mold member a polymerizable material selected from the group consisting of (i) a compound having a total of at least three acryloxy ($CH_2=CH\cdot CO\cdot O$—) and/or methacryloxy ($CH_2=C(CH_3)\cdot CO\cdot O$—) groups in the molecule, (ii) a monomer mixture comrising at least 40% by weight of said compound and at most 60% by weight of other copolymerizable ethylenially unsaturated monomer and (iii) a partially polymerized product of said compound or of said monomer mixture,
    b. adhering a preformed film having little or no affinity for said polymerizable material closely to the spread surface,
    c. polymerizing said polymerizable material to an extent such that the polymerized material can not be swollen with or dissolved into a monomer for the base resin to be charged into said mold member,
    d. removing the film from the polymerized material,
    e. charging a mixture of the monomer for the base resin and a polymerization initiator into the mold,
    f. polymerizing the monomer, and
    g. after the completion of polymerization, releasing the cast article from the mold, the improvement comprising coating said polymerizable material onto each upper surface of a plurality of continuously moving molds, aligned at stated intervals in the moving direction upstream of a polymerization zone wherein the coated polymerizable material is polymerized while passing therethrough, closely adhering, upstream of said polymerization zone a continuous length of said film onto the coated polymerizable material coated on the plurality of molds; and, downstream of the polymerization zone, continuously removing said film from the polymerized material.

10. A process according to claim 9 wherein said close adherence of the film is carried out by using a press roller having a soft periphery.

* * * * *